United States Patent [19]

Nagashima et al.

[11] 4,403,318

[45] Sep. 6, 1983

[54] APPARATUS AND METHOD FOR RECORDING, REPRODUCING AND ERASING ON OPTICAL RECORDING DISCS

[75] Inventors: Michiyoshi Nagashima, Hirakata; Tomio Yoshida, Katano; Takeo Ohta, Nara, all of Japan

[73] Assignee: Matsushita Electric Industrial Co., Ltd., Kadoma, Japan

[21] Appl. No.: 256,660

[22] Filed: Apr. 22, 1981

[30] Foreign Application Priority Data

Apr. 23, 1980 [JP] Japan ................................ 55-54506

[51] Int. Cl.³ .............................................. G11B 7/00
[52] U.S. Cl. .................................. 369/100; 369/116; 369/121
[58] Field of Search ................ 369/121, 122, 100, 116

[56] References Cited

U.S. PATENT DOCUMENTS 3,971,874  7/1976  Ohta et al. .
4,298,974  11/1981  Tsunoda et al. .................. 369/122

FOREIGN PATENT DOCUMENTS 2917726  11/1980  Fed. Rep. of Germany ...... 369/121
53-148410  12/1978  Japan .................................. 369/100
2044980A  10/1980  United Kingdom ................ 369/122

Primary Examiner—George G. Stellar
Attorney, Agent, or Firm—Cushman, Darby & Cushman

[57] ABSTRACT

An apparatus for recording, reproducing and erasing for an optical recording disc capable of recording information data with a high density, and capable of recording new information data and simultaneously erasing the previously recorded information data.

12 Claims, 9 Drawing Figures

APPARATUS AND METHOD FOR RECORDING, REPRODUCING AND ERASING ON OPTICAL RECORDING DISCS

BACKGROUND OF THE INVENTION

1. Field of the Invention

The present invention relates to an apparatus of optical recording, reproducing and erasing on a recording disc, and a method of optical recording, reproducing and erasing therefor.

2. Prior Art

Extensive research works have been hitherto made for realizing optical recording and reproducing disc apparatuses which comprise photosensitive recording films on optical recording disc substrates and which are capable of recording information data in the recording films and reproducing the data therefrom.

Laser light sources with high coherency have been employed as light sources used for the conventional optical recording disc apparatuses where light beams must be condensed with high reliability. It is highly expected that such laser light sources are replaced by semiconductor laser devices, which are more advantageous in realizing a more compact apparatus for optical recording discs and in having a possibility of direct light modulation.

On the other hand, as recording film materials various materials have been also studied and developed, for example thin films capable of causing localized evaporation thereof by light irradiation heating, or another thin films capable of causing localized changes in reflectivity and transmittance thereof upon light irradiation. As one of the thin films of the latter cases it has been proposed in the U.S. application filed on Aug. 26, 1974 (now patented under U.S. Pat. No. 3,971,874 for Ohta et al.) that thin films having a composition of $TeO_x$ ($0 < x < 2.0$) are applicable for optical recording system, by which high quality recording signals are obtainable. In the system a high recording sensitivity is obtainable, since the recording is made in a retrievable way, that is without any evaporation of component layer of the recording disc, and the thin films are stable and less sensitive in temperature and humidity, and besides obtained recording signals are of high quality.

When recording information data in the thin films, they are caused to locally change their physical nature from amorphous to crystal-like states by light irradiation. The light irradiation causes to increase the reflectivity of the thin films, which is evaporate-deposited on recording disc substrates. Optimum recording light source power is 6-9 mW for a recording disc substrate rotating at a rotational speed of 1,800 r.p.m. This means that a semiconductor laser device capable of emitting light energy of at least 20 mW is required when taken into account of a transfer efficiency for light passing through an optical system employed in the conventional optical recording disc apparatus. The most advanced semiconductor technology makes semiconductor laser devices available which are capable of stable and continuous lasing with lasing power more than 20 mW and wavelengths of about 800 nm falling into the near infrared wavelength range. Since focussed light beam radii are approximately proportional to the wavelengths of laser light, it is highly preferable to employ semiconductor laser devices capable of emitting visible light with wavelengths shorter than those in the near infrared wavelength range for the purpose of increasing a recording density. The optical recording on thin films having the above-mentioned composition do not change their geometrical shapes but change their physical nature, i.e. reflectivity and transmittance, at localized regions therein, and therefore it is also possible to erase the information data previously stored at the localized regions in a suitable manner.

On the other hand, it is also known that optical recording films of Se-Te are similarly applicable for optical recording and reproducing apparatuses capable of erasing stored information data by light irradiation thereon. It has been proposed in the Japanese published unexamined patent gazette No. Sho 53-148244 to provide optical recording and reproducing apparatus by employing optical recording films of Se-Te and using three laser light wavelengths. In the invention of this gazette, the employed wavelength of the reproducing beam light is selected to be longer than that of the beam light used for the erasing step. The disclosed optical recording and reproducing disc apparatus is also capable of erasing the previously optically stored information data in the recording disc films. The disclosed recording and reproducing disc apparatus utilizes a photo-irradiation effect at the erasing step in order not to heat the optical recording disc films, although the optical recording disc films are heated at the recording step upon light irradiation. However, it has been reported that such a photo-irradiation effect can be expected only for a wavelength range around 500 nm. Accordingly, it is necessary to employ bulky gas laser apparatuses such as Ar gas ion laser apparatus, since it is so far impossible to lase existing semiconductor laser devices at a wavelength range around 500 nm. In addition, the above-mentioned optical recording and reproducing disc apparatus has a shortcoming that the recorded information data stored in the optical recording disc films would be easily erased under sunlight, as far as the erasing process is effected by the above-mentioned photo-irradiation effect available around 500 nm. In order to overcome such a shortcoming, it is necessary that both recording and erasing processes are effected under a heating effect upon light irradiation upon an optical recording disc film. Then, the optical recording disc film, when suitably selected, is capable of stably storing the stored information data even under sun light, since heating energy produced by sun light irradiation would thermally diffused inside the optical disc substrate coated with the optical recording disc film.

For the several reasons described above, it is highly demanded to provide a compact optical recording and reproducing apparatus, which is capable of recording information data in optical recording disc films with a high density, and of reproducing the optically recorded data immediately after the recording or after recording, and further capable of erasing the stored information data. This is possible by employing semiconductor laser devices as recording, reproducing and erasing light beam sources, and by employing recording disc materials capable of both stable recording and erasing information data by heating caused by light irradiation upon the recording disc materials.

SUMMARY OF THE INVENTION

The present invention provides an apparatus for recording, reproducing and erasing on an optical recording disc, the apparatus comprising a plurality of laser light beam sources and capable of recording information data in optical recording disc films with a high density, and of reproducing the optically recorded data simultaneously with the recording or after recording, and further capable of erasing the stored information data.

DESCRIPTION OF THE PREFERRED EMBODIMENTS

Figure 1:
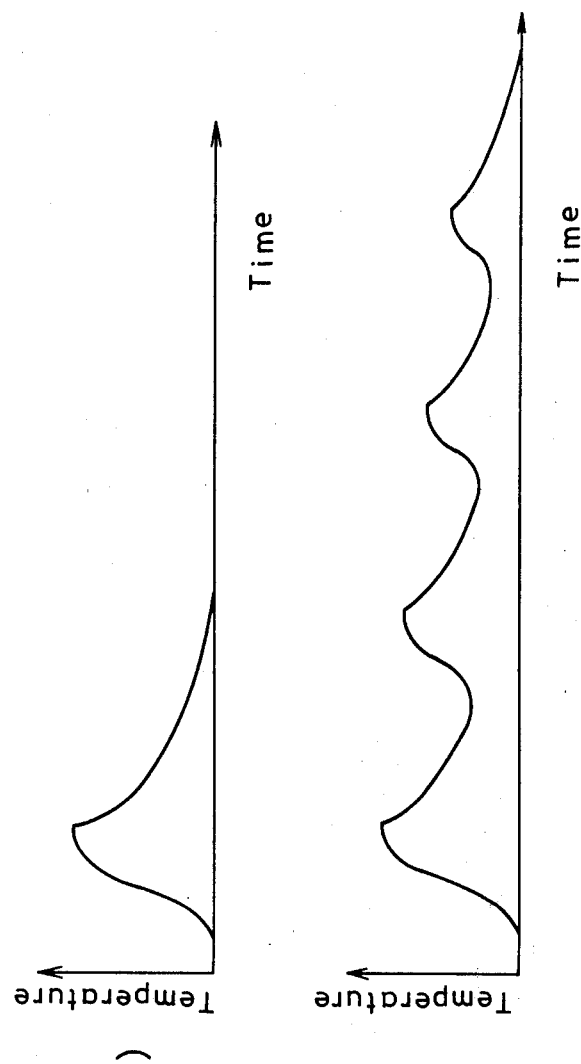
FIGS. 1(a) and 1(b) are graphs showing temperature curves for a recording film of a recording disc with respect to time, for recording and erasing processes, respectively.

The present invention provides an apparatus for recording, reproducing and erasing for an optical recording disc, at least surface of which changes its crystal structure from a first state to a second state which is optically different from said first state by heating followed by quick cooling, and restores to said first state by heating followed by slow cooling, the apparatus comprising:
- at least two light sources, each of which is for producing a light beam for irradiating a selected localized part on said recording disc,
- at least one light detecting means for detecting a light beam from said recording disc by reflection or transmission,
- an optical means for focussing and sweeping said light beam, based upon output signal of the light detecting means,
- a controlling means for selectively switching operation of the apparatus among the following operations:
  (i) for recording information data on said recording disc, a selected light beam modulated by information is irradiated on said recording disc,
  (ii) for reproducing information data from said recording disc, a light beam having a lower intensity level than that for said recording is irradiated onto said recording disc, and
  (iii) for erasing information data from said recording disc, at least two light beams, one of them having a higher intensity level than that for said reproducing is irradiated onto said recording disc.

It has been disclosed in a Japanese patent application No. Sho 55-49718 (applied by the assignee of the present application, and published as Japanese published unexamined patent gazette Sho No. 56-145530 that a thin film comprising tellurium sub-oxide with an additive, e.g. sulfur possesses remarkable optical characteristics usable for optical recording, reproducing and erasing purposes. For practical uses, such a thin film is formed by an evaporation method and deposited on an optical recording disc substrate, and subsequently a heat treatment is effected therefor. The thin film is crystal-like in a virgin state, i.e. before heating for recording. The recording is made for the thin film by heating specified regions thereof at a high temperature of hundred and several tens °C. and suddenly cooling it. By this heating and quenching process, the heated regions of the thin film becomes amorphous. Generally speaking, this chemical change brings about a reflectivity decrease thereby giving rise to a possibility of recording information data as the reflectivity changes in the heated localized regions of the thin film.

The recorded information data can be naturally reproduced by effecting irradiation of a reproducing light beam with an intensity level sufficiently lower than that of a recording light beam used for the recording. It is possible to erase the recorded information data by heating the specified denatured regions in the thin film and slowly cooling them. By this erasing process, the specified regions restore the original non-denatured crystal-like state with an increased reflectivity. A response time necessary for the erasing process is more than several 100 nsec., whereas the recording process requires a heating time of shorter than several 100 nsec.

The apparatus for optical recording, reproducing and erasing information data for a thin recording film employs the proposed film material described above, and semiconductor laser devices as light sources. The initially prepared thin film has a high reflectivity and a low transmittance. The heating process for recording the information data is made as follows:

When an optical recording disc substrate coated with the thin recording film rotates at a rotational speed of 1,800 r.p.m. and when a half-value width of a light intensity distribution formed by a light spot beam is smaller than 1 $\mu$m, then a scanning time of the light spot beam on the surface of the thin recording film of 20 cm in diameter is about 50 nsec. After the heating of specified regions in the thin recording film by the single laser light beam, the heat rapidly diffuses into the optical recording disc substrate in a short time below several 100 nsec. This means that the once-heated regions are rapidly cooled down thereby changing their crystal-like states to amorphous states. The thermally denatured regions thus have a low reflectivity and a high transmittance. The temperature change at the recording is shown in FIG. 1(a).

FIGS. 1(a) and 1(b) are graphs showing curves of temperature changes for a recording disc film with respect to time, for recording and erasing processes, respectively. In order to restore the initial non-denatured states thereby erasing the previously recorded information data, it is necessary to heat the respective denatured regions on the rotating recording disc substrate and cool them slowly thereafter. This slow-cooling process can be made in the following ways. The optical recording apparatus in accordance with the present invention comprises a plurality of semiconductor laser devices, and thus it is possible to energize some of them in order to produce at least two laser spot beams apart with a specified distance on the surface of the optical thin recording film.

A multi-stage heating process can be made by heating the previously denatured regions in the thin recording film by one of at least two laser spot beams with a specified light intensity level and subsequently heating the denatured regions by use of other spot beam(s) with another specified light intensity level slightly lower than that of the former laser light spot beam. This multistage heating processes are successively carried out for the rotating thin recording film thereby slowly cooling the heated regions. This slow-cooling causes the thermally denatured regions to restore the initial non-denatured states. The non-denatured regions, i.e. non-recorded regions remained unchanged at the completion of the erasing process.

It is naturally possible to reproduce the stored information data by irradiating the previously denatured regions by use of a laser light spot beam with a light intensity sufficiently lower than an intensity threshold level for affecting the physical and chemical characteristics of the thin recording film, and detecting reflection or transmission light coming from the thin recording film containing changes responding to the changes of the optical characteristics produced in the recording process.

In the erasing process it is important to maintain the temperature of the heated thin recording film at a high temperature for a sufficient time necessary for the heated amorphous regions to restore the initial crystal-like states. Therefore, it is not always necessary to specify light intensity levels for the laser light spot beams. But, an effective erasing process can be obtained by the following two ways that light intensities are successively decreased for several laser light spot beams, or that beam radii of the laser light spot beams are successively increased while making the light intensities of the spot beams almost equal to each other. The latter case corresponds to the situation that light power densities are successively decreased. Heating temperature changes in the erasing process are shown in FIG. 1(b).

In order to fulfill the heating condition in the erasing process, it is necessary to arrange a plurality of the light sources in such a manner that the spot beams line up along a direction parallel to a tangent direction of the rotation of the thin recording film. In this case, when several light beams from several light sources are focussed by several different optical systems, there might be a possibility that the focussed light spot beams do not line up on the surface of the thin recording film, even if the semiconductor laser devices as light sources are disposed to line up. Therefore, it is preferable to focuss all of the laser light beams by use of a single optical system. In such a case, it is also preferable to arrange a plurality of semiconductor laser devices in a row above the thin recording film. It is more preferable to employ a one chip semiconductor laser devices, if available. Moreover, it is necessary to install a suitable control means for driving the semiconductor laser devices independently responding to the operation modes (i.e. recording, reproducing or erasing) of the recording apparatus in accordance with the present invention. It is naturally possible to use other laser equipments than the semiconductor devices by slightly modifying optical system employed in the recording apparatus in accordance with the present invention.

In the erasing process, it is necessary to irradiate the recording film several light spot beams while tracing the already recorded regions under the control of the control means employed in the optical recording apparatus in accordance with the present invention. And it is much preferable to be able to rewrite another information data as new information data at the erased regions without affecting the neighboring recorded regions.

It has been proposed in another Japanese application No. Sho 55-49714 (applied by the assignee of the present application, and published as Japanese published unexamined patent gazette Sho No. 56-145535 that an optical recording disc substrate with a cross section of grooved shapes for recording track grooves is coated with a thin recording film. In such a case, it is necessary to carry out the recording, reproducing, erasing and rewriting along the formed grooves in the thin recording film. This tracking is made by using a photo-detecting device for receiving reflection light or transmission light from the thin recording film, and by controlling irradiation positions of the light beams on the surface of the thin recording film responding to output signals issued from the photo-detecting device. Beam focussing controlling can be similarly done following the tracking control described above.

Since several light spot beams are simultaneously irradiated upon the thin recording film in the erasing process, there arises a possibility of uncontrollable when a number of reflection or transmission light beams from the thin recording film impinge upon the photo-detecting means. Therefore, in the optical recording apparatus in accordance with the present invention the tracking control is made by detecting reflection or transmission light produced by only a single laser light spot beam among several spot beams, in all operation modes of the optical recording apparatus disclosed in the present application. A reproducing laser light spot beam can be used as such a tracking control spot beam, and at the recording and erasing the respective spot beam(s) is irradiated together with the reproducing laser light spot beam. It is naturally possible to use the reproducing laser light spot beam at the recording by changing the light intensity thereof and modulating it responding to information data to be recorded, as proposed in an earlier Japanese patent application No. Sho 53-104037 (published as Japanese published unexamined patent gazette Sho No. 55-32238). It is most important to pay attention to separate reflection or transmission light used for the tracking control light beam from other reflection or transmission light used for other purposes. Therefore, care should be taken not to reach other beams than the reproducing laser light spot beam upon the photo-detecting device.

Figure 2:
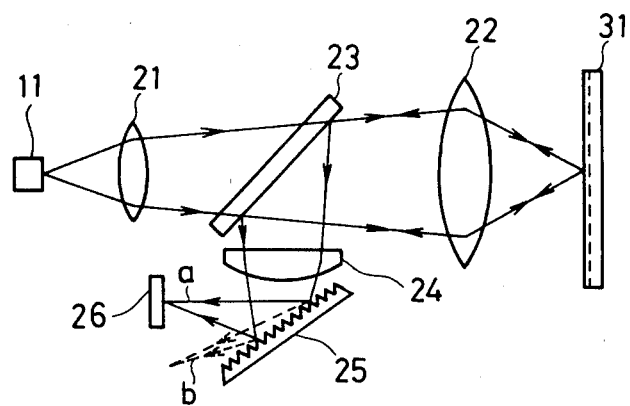
FIG. 2 is a schematical view showing principal optical components of a recording, reproducing and erasing apparatus embodying the present invention.

For the sake of easy tracking controlling, a wavelength of the reproducing light beam is selected to be different from that of the other light spot beams. Therefore, it is possible to separate the reproducing light beam from other light beams by changing light beam directions responding to the wavelengths in a spectroscopic method used for the reflection or transmission light. The spectroscopic separation is carried out by, e.g. a prism or a diffraction grating. FIG. 2 is a schematic view showing principal optical components of a recording, reproducing and erasing apparatus embodying the present invention. In the optical system shown in FIG. 2, reflection light from the thin recording film is used for detection of the tracking control spot beam as the reproducing spot beam, and a reflection-type diffraction grating is employed as the spectroscopic means.

A light source 11 is provided with a bulk of a number of semiconductor laser devices therein. Light beams are focussed thereby producing light spot beams on the surface of a thin recording film on an optical recording disc 31 by use of two objective lenses 21 and 22. Laser light beams from the light source 11 are not separately drawn in FIG. 2 for simplicity. A beam splitter 23 is used to separate the reflection light beam from the incident light beams. The separated reflection light beams pass through a lens 24, and their propagating directions are changed by a diffraction grating 25 responding to their wavelengths. When an astigmatic system is employed for controlling light beam focussing, a cylindrical lenz serves as the lenz 24.

Reflection light "a" is produced by a reproducing light beam and impinges upon a photo-detecting device 26. Reflection light "b" is separated from the reproducing light, and does not reach the photo-detecting device 26. By setting magnification of the optical system so as to produce an image of one half of the light sources on the surface of the thin recording film, and arranging semiconductor laser devices so as to line up apart from each other with a distance of 10 μm, then the irradiating laser light spot beams line up with a distance of 5 μm on the surface of the optical recording disc substrate 31. This means that a spot region of 100 mm in radius on the optical recording disc substrate rotating at a rotating speed of 1,800 r.p.m. is heated at an interval of about 250 nsec. Therefore, the erasing can be made by heating as illustrated in FIG. 1(b).

Although it is naturally preferable to make the tracking control as correct as possible, there is a limit in the tracking control, since the tracking on the surface of the thin recording film is precisely controlled by detecting deviations of the scanning position of the light spot beam. Theoretically speaking, these deviations never become zero. By taking into account of this control error, it is to be noted that the wavelength of the erasing light beams are preferably longer than that of the reproducing spot beam. In other words, it is preferable to make the erasing light spot beams larger than the reproducing light spot beam thereby completely to cover the denatured recorded regions.

It is also very effective in order to increase storing information densities to make the wavelength of the reproducing light spot beam smaller than those of other light beams used for the purposes other than the reproducing. For the recording of the information data in an optical recording material, it is necessary to irradiate the recording material with a light beam having a high intensity level in some extent, depending on denaturing sensitivity of the optical recording material.

Figure 3A:
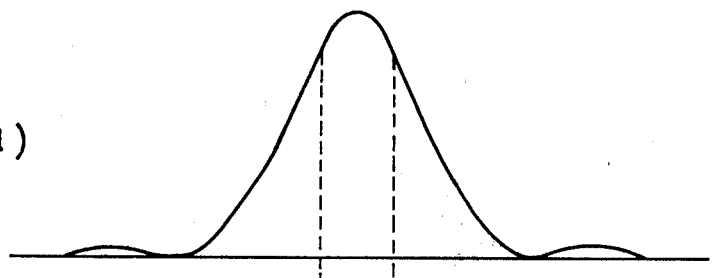
FIGS. 3(a) and 3(b) are enlarged views showing a light intensity distribution of a focussed light spot beam on recording track regions in an apparatus embodying the present invention in a recording step.
Figure 3B:
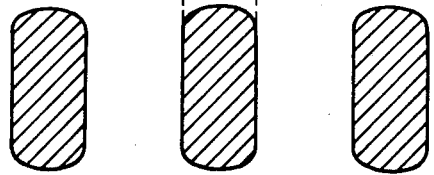
Figure 3:
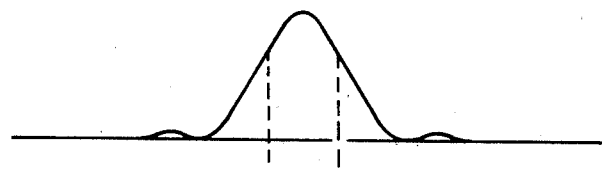
FIGS. 3(c) and 3(d) are enlarged views showing a light intensity distribution of a focussed light spot beam on recording track regions in an apparatus embodying the present invention in a reproducing step.

FIG. 3(a) is a graph showing a light intensity distribution of a focussed recording light spot beam on recording track regions (shown in FIG. 3(b)) in a thin recording film employed in an apparatus embodying the present invention. As shown there, the width of the thermally denatured regions is much smaller than the whole width of the recording light spot beam. The pitch of the thermally denatured regions is closely dependent on the whole width of the light spot beam, and therefore it is better to make the width of the light spot beam as small as possible. That is, it is necessary to make the light spot beam section as small as possible for the purpose of increasing the recording density. That is why a shorter wavelength is preferable.

With the up-to-date technology, available semiconductor laser devices are capable of generating light power of at least about 20 mW, which is necessary for the recording, but the wavelengths thereof are more than about 800 nm. There are other semiconductor laser devices not capable of generating such high power necessary for the recording, but capable of generating lower power (about 3 mW), which is necessary for the reproducing, at a wavelength of about 700 nm in a visible light wavelength range. Accordingly, it is preferable to use the semiconductor laser devices capable of generating a visible light beam at a wavelength slightly longer than 700 nm in order to generate a reproducing light beam, which at the same time is used as a light beam for the tracking purpose. On the other hand, it is necessary to employ high power semiconductor laser devices capable of generating high intensity light beams with a wavelength slightly longer than 800 nm in a far-infrared wavelength region.

Figure 3D:
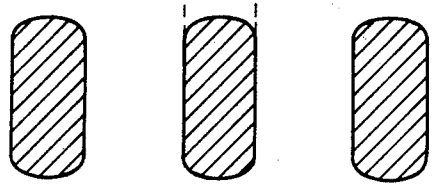

FIG. 3(c) is a graph showing a light intensity distribution of a focussed reproducing light spot beam on recording track regions (shown in FIG. 3(d)) in a thin recording film employed in an apparatus embodying the present invention. The reproducing light spot beam sufficiently decays at the neighboring recorded regions thereby giving rise to decrease of cross-talk and improvement in increasing recording density.

Figures 4A, 4B:
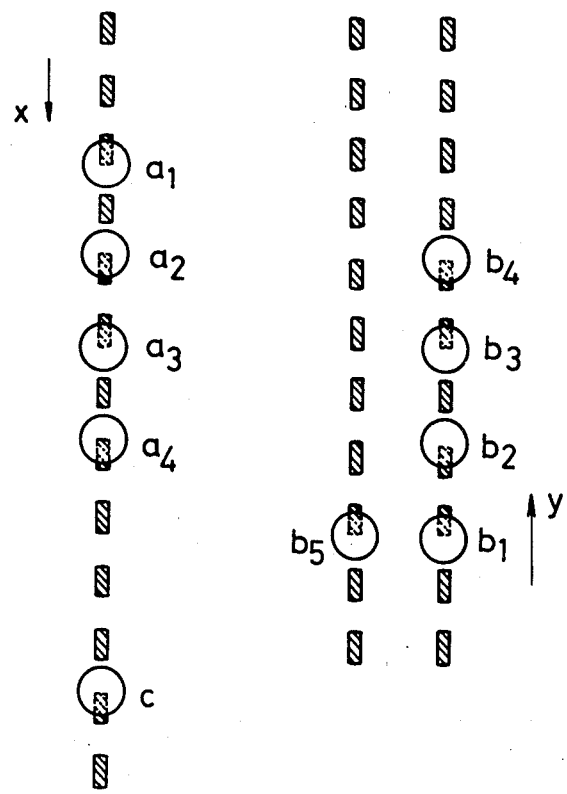
FIGS. 4(A) and 4(B) are enlarged views illustrating two examples of arrangements of laser light spot beams on an optical recording disc film employed in a recording apparatus embodying the present invention.

FIGS. 4(A) and 4(B) are enlarged views illustrating two examples of arrangements of laser light spot beams on an optical recording disc film employed in a recording apparatus embodying the present invention.

It is shown in FIG. 4(A) that four light spot beams $a_1$ to $a_4$ produced by four semiconductor laser devices sweep on a thin recording film on a recording disc substrate. The light spot beam $a_1$ corresponds to a light spot beam with the shortest wavelength used for reproducing and tracking control. By tracing a row of the recording regions, the recording is made by a high light intensity by using, for example the light spot beam $a_2$, and the erasing is made by successively irradiating the recorded regions by using, for example the light spot beams $a_2$, $a_3$ and $a_4$. It is also possible, as described above, to use the light spot beam $a_1$ for both reproducing and recording by changing the intensity thereof. In addition, it is further possible to carry out the erasing operation by using all of the light spot beams. However, as far as semiconductor laser devices generating a light beam of a shorter wavelength but with a low intensity are concerned, it is better to increase an information data density by separately using the light spot beam $a_1$ for the reproducing and the light spot beam $a_2$ for the recording. The tracking control exemplified by the case shown in FIG. 4(A) is applicable for a thin recording film formed on an optical recording disc substrate with special grooved tracks thereon. In this case, it is possible to rewrite new information data at the previously denatured regions after erasing, by tracing the formed tracks.

On the other hand, it is shown in FIG. 4(B) that an additional light beam spot $b_5$ is used, while tracing the recorded regions, to record new information data at regions next to the traced recorded regions. That is, the recording is made by the light spot beam $b_5$ and the tracking control is made by use of a light spot beam $b_1$. Light spot beams $b_1$ to $b_4$ are used in a similar manner to the case of the light spot beams $a_1$ to $a_4$.

When a light spot beam "c" is focussed on the thin recording film at a position apart from the four lined light spot beams $a_1$ to $a_4$, and irradiates the position with a high light intensity after the position . . . $a_2$ to $a_4$, then the recording film at the position is heated and suddenly cooled down. This means that it is possible to record new information data while simultaneously erasing the previously recorded data. This simultaneous erasing and recording is made by tracking and reproducing the information data to be erased by use of the light spot beam $a_1$, and simultaneously erasing them by the light spot beams $a_2$ to $a_4$, and further recording new information data by use of the light spot beam "c". In this case, it is possible to use a composite light source provided with the semiconductor laser devices for generating the light spot beams $a_1$ to $a_4$, and to use a common optical system for four beams. But, it is not always possible to provide the semiconductor laser device for generating the light spot beam "c", in the composite light source, since the disposing position thereof is dependent on a distance between two light spot beams $a_4$ and c, which distance is selected by taking into account of a thermal diffusion time and an erasing time (slowly cooling time). This disposition problem exists for the reason described above, and for the reason that it is not always possible to employ a common optical system.

In conclusion, the disclosed apparatus for recording, reproducing and erasing for an optical recording disc is compact, capable of recording information data with a high density, and capable of recording new information data and simultaneously erasing the previously recorded information data.

On the other hand, the disclosed method of recording, reproducing and erasing for an optical recording disc provides possibilities of speedy recording, and simultaneous recording while erasing previously recorded data.

What is claimed is:

1. A method of erasing information optically recorded in a thin recording film in the form of a distribution of thermally denatured regions therein comprising the steps of:
    producing at least two light beams,
    focusing said at least two light beams to form at least two focused light beams on said thin recording film,
    sweeping said at least two focused light beams successively along one track of recording on said thin recording film, and
    applying said at least two focused light beams on said thin recording film so as to successively result in a higher heated part and later a less heated part along said one track.

2. A method of erasing in accordance with claim 1, wherein the erasing is made by said focused light beams followed by immediately thereafter recording new information data by use of additional focused light beam successively irradiating a place on said recording track and apart from said light beams with a predetermined distance.

3. A method of erasing in accordance with claim 1, wherein energy densities of said light beams on said recording disc are successively decreased.

4. A method of erasing in accordance with claim 3, wherein the decrease of energy densities is attained by successively increasing spot sizes of said light beams on said recording disc.

5. A method of erasing in accordance with claim 3, wherein the decrease of energy densities is attained by successively decreasing light intensities of said light sources.

6. An apparatus for recording, reproducing and erasing for an optical recording disc, at least the surface of which changes its structure from a first state to a second state which is optically different from said first state by heating followed by quick cooling, and restores to said first state by heating followed by slow cooling, the apparatus comprising:
    at least two light sources for producing light beams including a first light beam and irradiating selected localized parts on a single recording track on said recording disc,
    at least one light detecting means for detecting a light beam from said recording disc by reflection or transmission due to said first light beam,
    an optical means for focusing and sweeping said light beams along said recording track, based upon output signals of the light detecting means,
    a controlling means for selectively switching the operation of the apparatus among the following operations:
        (i) for recording information data on said recording disc, a selected light beam from said light sources and modulated by information is irradiated on said recording disc,
        (ii) for reproducing information data from said recording disc, said first light beam having a lower intensity level and a shorter wavelength than that for said recording is irradiated onto said recording disc, and
        (iii) for erasing information data from said recording disc, at least two of said light beams, one of them having a higher intensity level than that for said reproducing, are successively irradiated onto said recording disc.

7. An apparatus for recording, reproducing and erasing for an optical recording disc, at least the surface of which changes its structure from a first state to a second state which is optically different from said first state by heating followed by quick cooling for recording, and restores to said first state by heating followed by slow cooling for erasing, the apparatus comprising:
    at least two light sources for producing light beams including a first light beam and irradiating selected localized parts on a single recording track on said recording disc,
    at least one light detecting means for detecting a light beam from said recording disc by reflection or transmission due to said first light beam,
    an optical means for focusing and sweeping said light beams along said recording track, based upon output signals of the light detecting means,
    a controlling means for selectively switching the operation of the apparatus among the following operations:
        (i) for recording information data on said recording disc, a selected light beam from said light sources and modulated by information is irradiated on said recording disc,
        (ii) for reproducing information data from said recording disc, said first light beam having a lower intensity level than that for said recording is irradiated onto said recording disc, and
        (iii) for erasing information data from said recording disc, at least two of said light beams, one of them having a higher intensity level than that for said reproducing, are successively irradiated along said single recording track on said recording disc.

8. An apparatus in accordance with claim 7, wherein a wavelength of said first light beam is shorter than those of the other light beams.

9. An apparatus in accordance with claim 7 or 8, further comprising a spectroscopic means disposed in a light path between said optical recording disc and said light detecting means.

10. An apparatus in accordance with claim 6 or 7, wherein said first light beam is a beam for reproducing.

11. An apparatus in accordance with claim 6 or 7, further comprising an additional light source for producing an additional focused light beam on a recording track adjacent said single recording track, said additional focused light beam being for recording new information data on the adjacent recording track while tracing the recorded regions on said single recording track.

12. An apparatus in accordance with claim 6 or 7, further comprising an additional light source for producing additional focused light beam on said single recording track and apart from said light beams with a predetermined distance, said additional focused light beam being for recording new information data while erasing old information data.

* * * * *